Oct. 30, 1934.  L. OSTROW  1,979,228

ADVERTISING MAKE-UP, FOLLOW-UP, AND LAY-OUT APPARATUS

Filed Sept. 29, 1932  6 Sheets-Sheet 1

Oct. 30, 1934.  L. OSTROW  1,979,228

ADVERTISING MAKE-UP, FOLLOW-UP, AND LAY-OUT APPARATUS

Filed Sept. 29, 1932  6 Sheets-Sheet 2

Inventor
L. Ostrow
By Robb & Robb
Attorneys

Oct. 30, 1934.   L. OSTROW   1,979,228

ADVERTISING MAKE-UP, FOLLOW-UP, AND LAY-OUT APPARATUS

Filed Sept. 29, 1932   6 Sheets-Sheet 5

Inventor
L. Ostrow
Robb & Robb
Attorneys

Oct. 30, 1934. L. OSTROW 1,979,228

ADVERTISING MAKE-UP, FOLLOW-UP, AND LAY-OUT APPARATUS

Filed Sept. 29, 1932 6 Sheets-Sheet 6

Inventor
L. Ostrow
By Robb & Robb
Attorneys

Patented Oct. 30, 1934

1,979,228

UNITED STATES PATENT OFFICE 1,979,228

ADVERTISING MAKE-UP, FOLLOW-UP, AND LAY-OUT APPARATUS

Louis Ostrow, Brooklyn, N. Y.

Application September 29, 1932, Serial No. 635,456

24 Claims. (Cl. 101—1)

The present invention relates to an advertising make-up, follow-up and lay-out apparatus of the general type set forth in my prior Patent 1,261,847 granted April 9, 1918, upon which this invention represents improvements. The purposes of the invention are more or less concisely explained in that patent, but by these improvements, the utility of the system is greatly enhanced and extended.

By the use of my prior invention the routine of making up and laying out a classified advertisment page was greatly facilitated over the known general processes, and it is the primary object of this invention to not only more decidedly facilitate such routine as there followed, but to extend the general method to include important additional steps.

More specifically speaking, it is an objective here in this instance to eliminate entirely the usual composing room handling including the typesetting and proof reading, of the numerous ads involved in a classified page, by initially writing the ads as received upon a type imitating machine and then resorting to a photo-engraving operation of the set-up when the make-up and lay-out has been completed.

Further, in the use of my previous apparatus, when it was desired to remove the ads or the make-up copy therefor, more strictly speaking, from the make-up and lay-out frame, as the number of inserts of said ads was complete, it was necessary to pick out each particular ad copy supporting member from among the hundreds of which a page was composed. With my present improvements, this is readily accomplished each day by an automatic throw-out mechanism which ejects from the chase all of the one-time inserts simultaneously or corresponding two- or more-time insertions, as the case may be, by a simple manipulation of an ejector key. The ejecting mechanism, as it is composed of selector members and cooperating adjustable ejector elements, forms a very important feature of these improvements.

Under present practice, newspapers rarely are aware of the daily number of lines of classified advertising which has been put out by them, in spite of the value of this knowledge to them. This information is usually obtainable only through a bureau or service outside of their own organization. It is, however, another object of my invention to provide in this apparatus a line or ad counter mechanism so that each day the number of lines of advertising may be quickly determined automatically in the use of the apparatus as hereinafter described.

Other and further objects and advantages of the invention will be hereinafter set forth and the novel features thereof defined by the appended claims.

In the drawings:—

Like reference characters designate corresponding parts in the several figures of the drawings.

Main frame or chase construction

Figure 6:
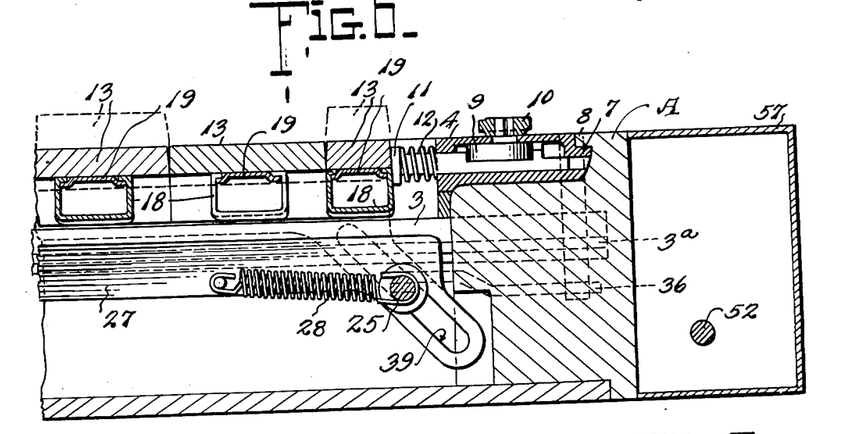
Fig. 6 is a similar view on the line 6—6 of Fig. 4.
Figure 7:
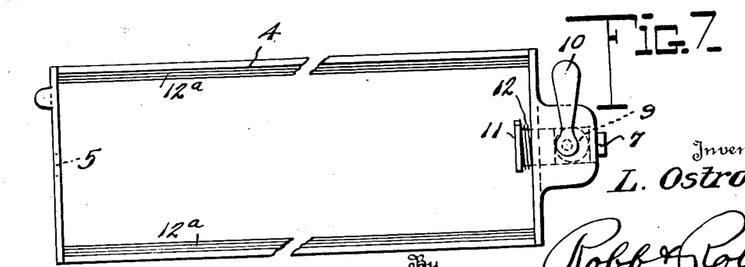
Fig. 7 is a plan view of a base member holder or panel frame.

In the apparatus as shown in the drawings, a chase or main make-up frame A is provided of the usual newspaper page size equivalent to the customary composing room chase or larger as desired. This frame may be made of wood or other light material so far as the purposes of this invention are concerned. This frame is provided with longitudinal supporting members or rests 2 and 3 (see Figure 3) for supporting the column or panel frames 4 while in position in the main frame A of the apparatus. These panels, one of which is shown in detail in Fig. 7, are all identical and comprise an elongated rectangular frame portion formed with a latch keeper 5 or engaging shoulder arranged for engagement by a finger latch 6 mounted in the main frame A. The upper end of the panel 4 is provided with a retaining lug 7 which is disposed under the shoulder 8 formed in the frame A, as clearly seen in Fig. 6.

Each frame 4 is also provided with a block clamping device comprising a cam 9 operable by a lever 10 to force the clamping rods 11 against the uppermost ad block when assembled in the frame as hereinafter more clearly described. A light spring 12 may be provided for holding the rod 11 against the blocks when the cams are rotated to unlock the blocks in the panels.

From the foregoing it will be observed that a frame such as used in practically all newspapers, will contain space for eight columns and that each column will comprise a removable panel frame which is first inserted into the top of the frame and the lower end then lowered into locking relation with respect to the catches 6.

The side pieces of the block holding panels 4 are each provided with a block retaining flange having inclined walls 12a, 12b (see Fig. 3) for the purpose of assisting in securing the advertisement blocks, now to be described, in position and to cause ejection of such blocks, depending upon the engagement of the spring detents carried by the blocks with one or the other of the inclined walls 12a or 12b.

Advertisement blocks or bases

Figure 12:
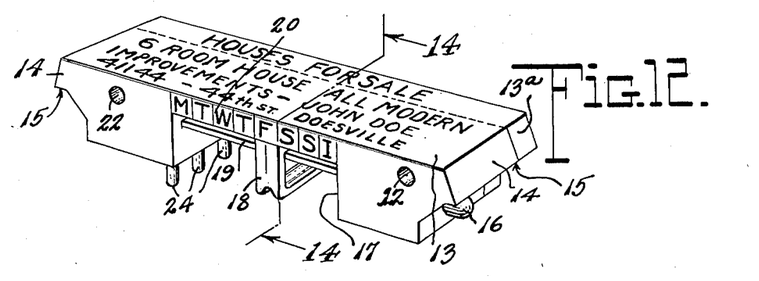
Figs. 12 and 13 are perspective views of one of the removable blocks or bases used in the layout and showing the manner of mounting the block ejecting clip.
Figures 13, 14, 15, 16, 17:
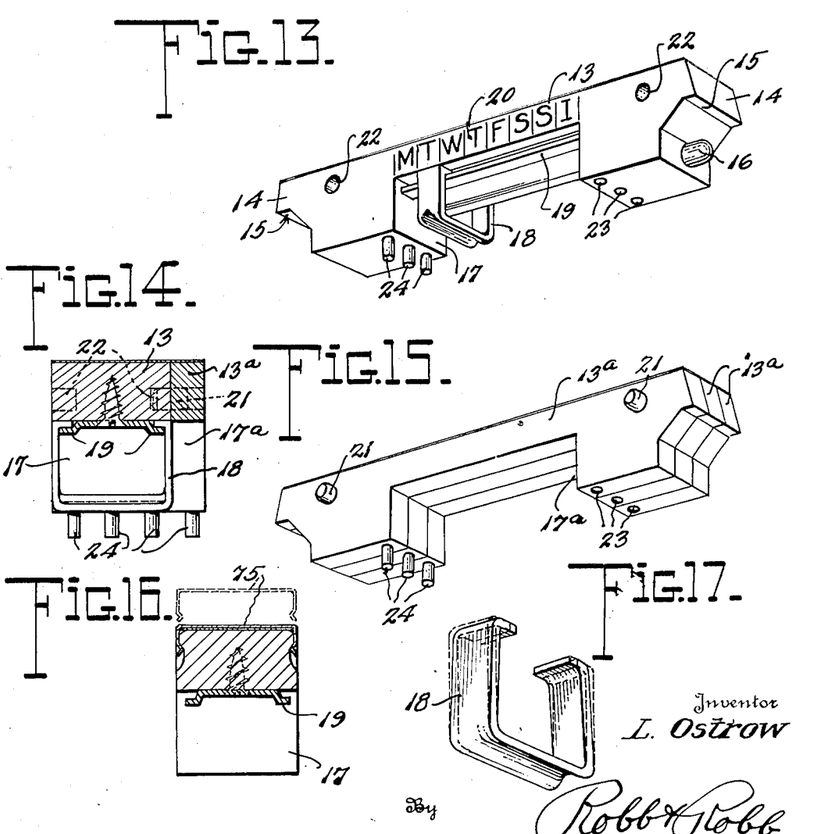
Fig. 14 is a sectional view on the line 14—14 of Fig. 12.
Fig. 15 is a perspective view showing block extensions for increasing the size of any one of the ad holding base members.
Fig. 16 is a transverse sectional view through a base member constructed especially for a transparent cover or clip for holding the ad slips.
Fig. 17 is a perspective view of an ejector clip for the base members.

Referring to Figures 12 and 17, it will be observed that the blocks 13 which are to form the bases for advertisement inserts are somewhat rectangular in form and are provided with overhanging end portions 14 forming the supporting shoulders 15 adapted to engage the upper portion of the column panel side pieces 12 when the blocks are placed therein.

A spring pressed camming detent 16 is arranged in each end of the block and is engageable with the inclined wall 12b when the block is forced downwardly beneath the top of the side pieces or rails 12 in the panel. Due to the inclination of the surface 12b, the block will be retained in this position although it may be slid along the column frame to any point desired. The block may be readily removed from the frame when the locking means for the block assembly is released by simply exerting a sufficient pressure upwardly to cause the latches 16 to slide inwardly and escape from the faces 12b.

The central portions of the blocks 13 are cut away to form recesses 17 to accommodate the vertical movement of the ejector bars carried by the main frame, as later to be described, and also to accommodate the adjustable block-ejecting clip 18 slidably mounted on the flanges 19. These ejector clips 18 are of U-shape and formed of resilient material so as to frictionally grip the edges of the flanges 19, preventing any accidental displacement of the clips once they have been properly set.

Figure 3:
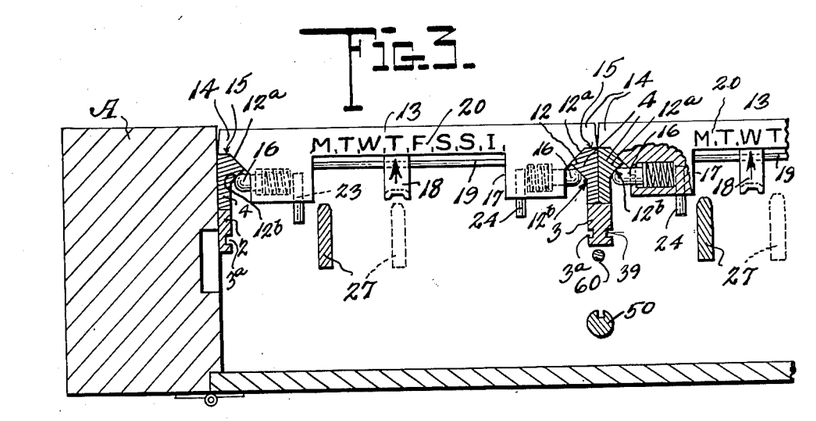
Fig. 3 is a sectional view taken approximately on the line 3—3 of Fig. 1.

Referring particularly to Figs. 3, 12 and 13, the blocks 13 are provided with indicia 20 indicating the day of the week that it is desired to eject that particular block when the block ejecting clip is associated with one of the indicating elements. The first letter M indicates Monday, and so on for the days of the week, while the last letter I indicates an indefinite period during which the advertisement is to be run. It is to be understood that these particular designations may be changed to numerical indicia, indicating the number of times an advertisement is to be inserted.

If a block is inserted in the column panel with the clips set as shown in Figure 12, that block will be ejected on Friday, when the ejecting mechanism later to be described is operated in the manner set forth. When the clip is set as seen in Figure 13, the block will be ejected on Tuesday, and so on.

While it is contemplated to provide blocks of different widths for the different number of advertising lines used, I have shown certain blocks 13a, called blanks, which, as seen in Figures 14 and 15, are provided with pins or dowels 21 adapted to be inserted in the apertures 22 of the blocks 13. These blank blocks are cut away at 17a similar to the blocks 13, but they do not carry the flanges, the spring clips, or the spring detents. In odd size advertisements, one of the main blocks 13 may be used and one or more of the blank blocks may be secured thereto in order to accommodate the particular ad. Obviously, blocks may be provided with lateral or end extensions where it is desired to take care of an ad of two or more column width.

Adjacent the edge of the recess 17 and also the recesses 17a on the blocks 13 and 13a are a series of holes 23 arranged to have inserted therein pins 24 which constitute the actuating means for the line counting mechanism hereinafter to be described.

As before stated the width of the blocks generally controls the number of lines of the advertisement. However, should the advertisement be of such a character that a variation in the number of lines results, the removal, or the insertion, of one or more pins 24 in the holes will govern the correct registration of the lines for that particular block by the counter.

Ejector mechanism

The ejecting mechanism will now be described, reference being made particularly to Figs. 4, 5, and 6 of the drawings. Disposed on a pair of shiftable guide bars 25—26 are a plurality of longitudinally shiftable ejector bars 27 held normally toward the top or upper portion of the main frame A by the springs 28 secured at one end to the bars 27 and at the other end to the guide bars 25.

There are eight of these ejector bars 27, one for each column panel in the main frame A and these bars are moved simultaneously by a shifting movement of the guide bars 25—26.

The bottom bar 26 is provided with a rack 29 with which a gear segment 30 is meshed. The segment is fixed on a shaft 31 carrying an operating pointer 34 which cooperates with suitable indicia indicated at 35, similar to the indicia 20 on the blocks 13.

The ends of the guide bars 25—26 are supported by pivoted levers 36—37, the levers 37 being of bell crank formation and having their slotted arms 37a connected to the respective bars 25—26.

It will be apparent from the above that the actuation of the pointer 34 will cause shifting of all of the ejector bars 27 to any position indicated by the pointer on the frame A, speaking with reference to the relative positions occupied by the block ejector clips with which the ejector bars cooperate.

In order to effect a lifting movement of the ejector bars 27 to eject blocks due to be thrown out, the ends of said bars which engage the guide bars 25—26 are provided with longitudinal camming slots 39 and 40, (see Figs. 5 and 6) which cam the bars upwardly so that they are moved longitudinally below their respective column panels and their blocks 13 or 13a.

Figure 4:
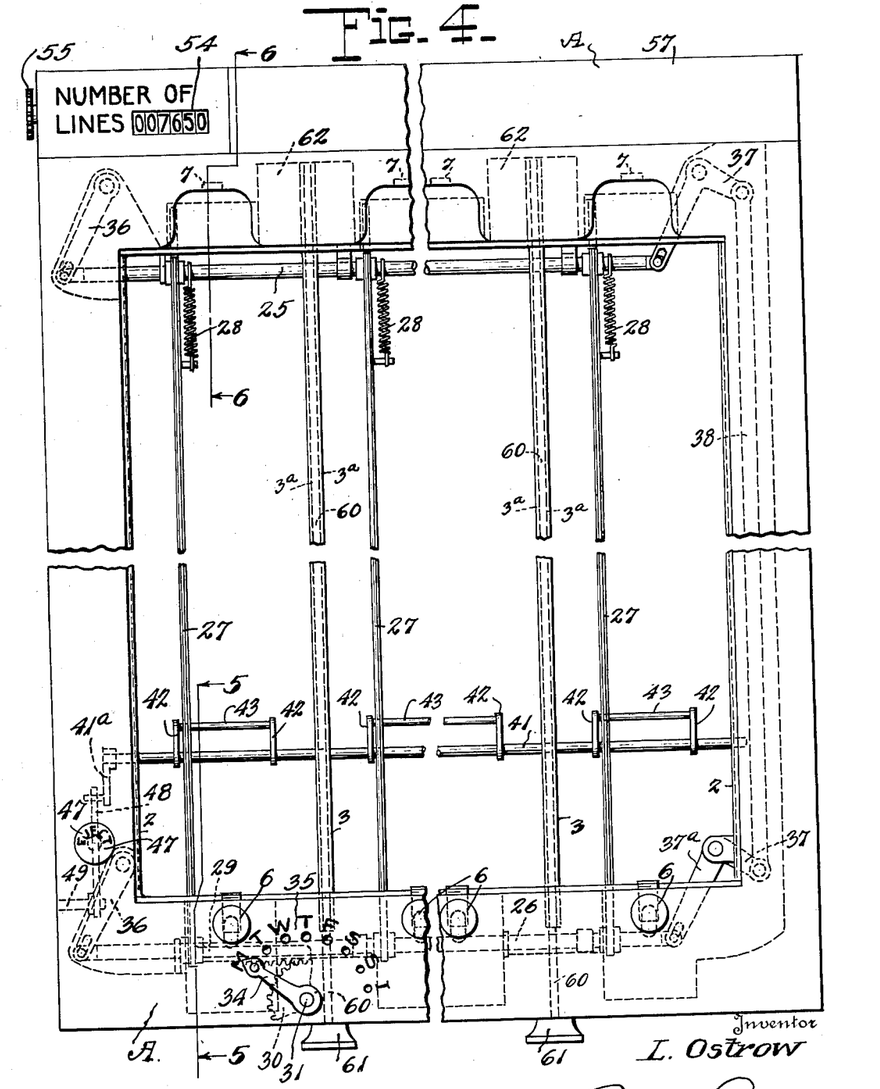
Fig. 4 is a plan view of the chase or main frame with the column panel frames removed to show more clearly the ejector bars.
Figure 5:
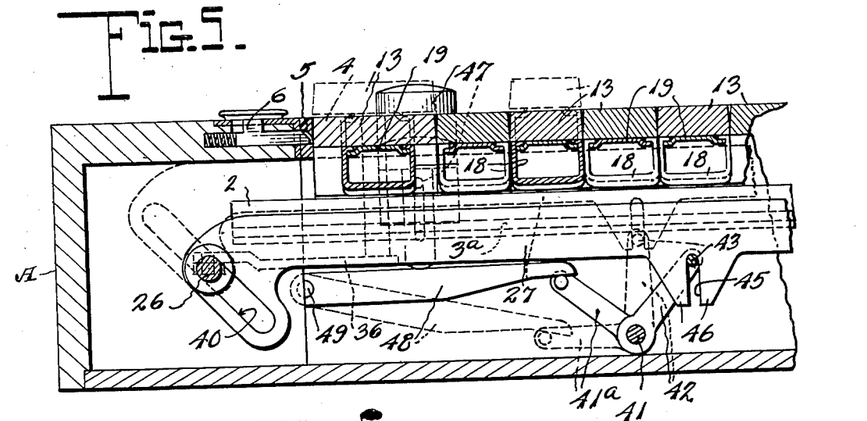
Fig. 5 is an enlarged fragmentary sectional view taken about on the line 5—5 of Fig. 4.

The actuating means for the bars 27 comprises a cross shaft 41 carrying a plurality of groups of levers 42 fixed thereto, the levers of each group being interconnected by the bars 43 (see Figs. 4 and 5). These bars 43 engage the slots 45 formed by the downwardly extending arms 46 on the ejector bars 27.

The actuating means for the ejector mechanism comprises an ejector button 47 the shank of which contacts slidably with a lever 48 pivoted at its end 49. At its other end the lever 48 engages the crank arm 41a on the end of the shaft 41. When the button 47 is depressed by the operator, the shaft 41 will be rocked causing all of the ejector bars 27 to be moved longitudinally against the action of tension springs 28. Due to the slotted engagement of the bars with the guide rods 25—26, these ejector bars will be moved bodily upwardly to cause ejection of certain of the blocks 13 whose clips 18 have been positioned to register with that particular setting of the ejector bars, as indicated by the pointer handle 34.

An operation of the device as thus far described may be given as follows:

The blocks having been inserted in their respective panel frames and clips thereof adjusted to the proper point according to the number of insertions of the advertisements, on the first day, for example Monday, the blocks or advertisements which have been set for one insertion will be ejected when the clamping means for the forms are released and the button 47 depressed, assuming that previously thereto the indicator 34 has been turned to M (Monday). The adjustment of the indicator just mentioned positions all of the ejector bars to coact with the clips which have been positioned at the first point. The new advertisement blocks may be inserted during this day. Upon the second day the indicator is moved to T and the button 47 depressed to throw out all of those blocks whose advertisements are for two insertions. This is carried out each day of the week and very greatly facilitates the daily make-up process.

*Line counting mechanism*

The line counting mechanism as seen in Figs. 1 and 8 to 11 comprises a plurality of splined shafts 50 suitably journalled in the frame A and extending beyond the rear wall to fixedly receive bevelled gears 51.

Figure 8:
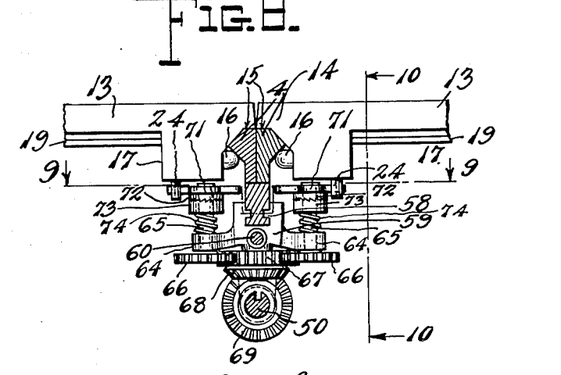
Fig. 8 is a sectional view taken about on the line 8—8 of Fig. 1, and showing certain details of the line counter mechanism, or the gear and clutch unit thereof.
Figure 9:
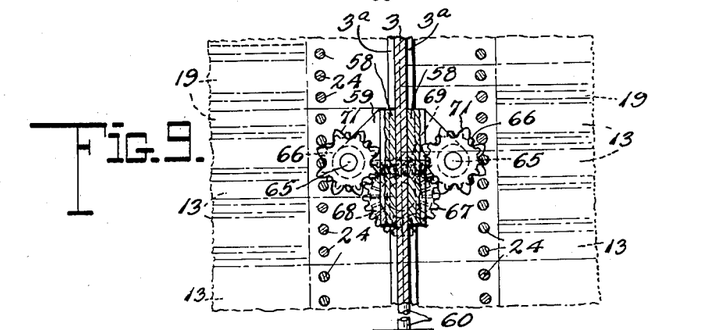
Fig. 9 is a horizontal sectional view on the line 9—9 of Fig. 8 looking downwardly.

A line counter operating shaft 52 is also journalled at one end of the frame in brackets 53 and extends into the line counter unit 54. This counter unit is of usual form and is not shown or described in detail other than that it may be said that a reset knob 55 is provided for setting the counter back to zero. It should here be observed that there is only one operating shaft 50 for every two column panels 4, each shaft being disposed directly beneath the panel support 3 and intermediate each pair of panels.

The shaft 52 has secured thereto bevelled gears 56 meshing with the gears 51 to effect rotation of any of the splined shafts 50.

A suitable casing 57 is provided to conceal the gearing arrangement just described.

Figures 10, 11:
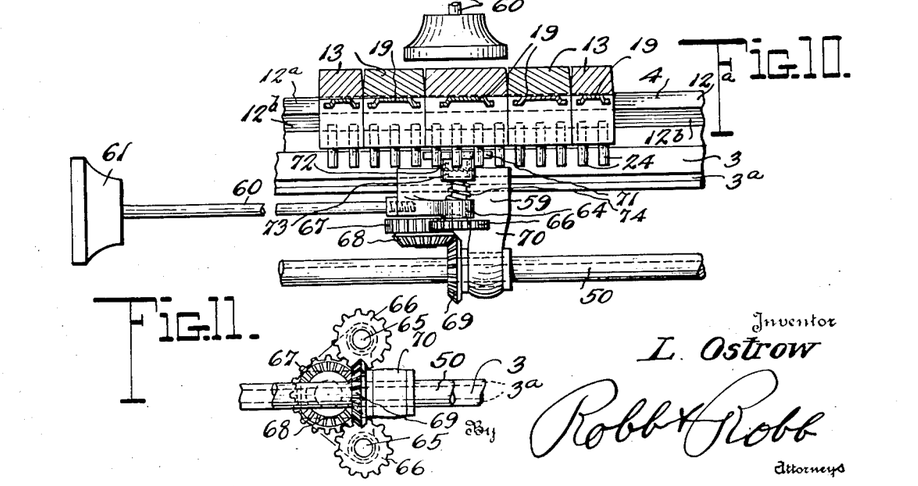
Fig. 10 is a sectional view on the line 10—10 of Fig. 8 looking in the direction of the arrows.
Fig. 11 is a detail bottom plan view of the counter operating unit as shown in Fig. 8.

Referring particularly to Figs. 8 and 11, the column panel supports 3 are provided with guide channels 3a in which the guides 58 of the counter shaft actuating devices 59 project.

These actuating devices 59 are in reality clutch and gear units adapted to be moved longitudinally of the supports 3 by the actuating rods 60 secured thereto. The free ends of the rods 60 pass through the bottom end of the frame A and have secured thereto the operating knobs 61.

Figure 1:
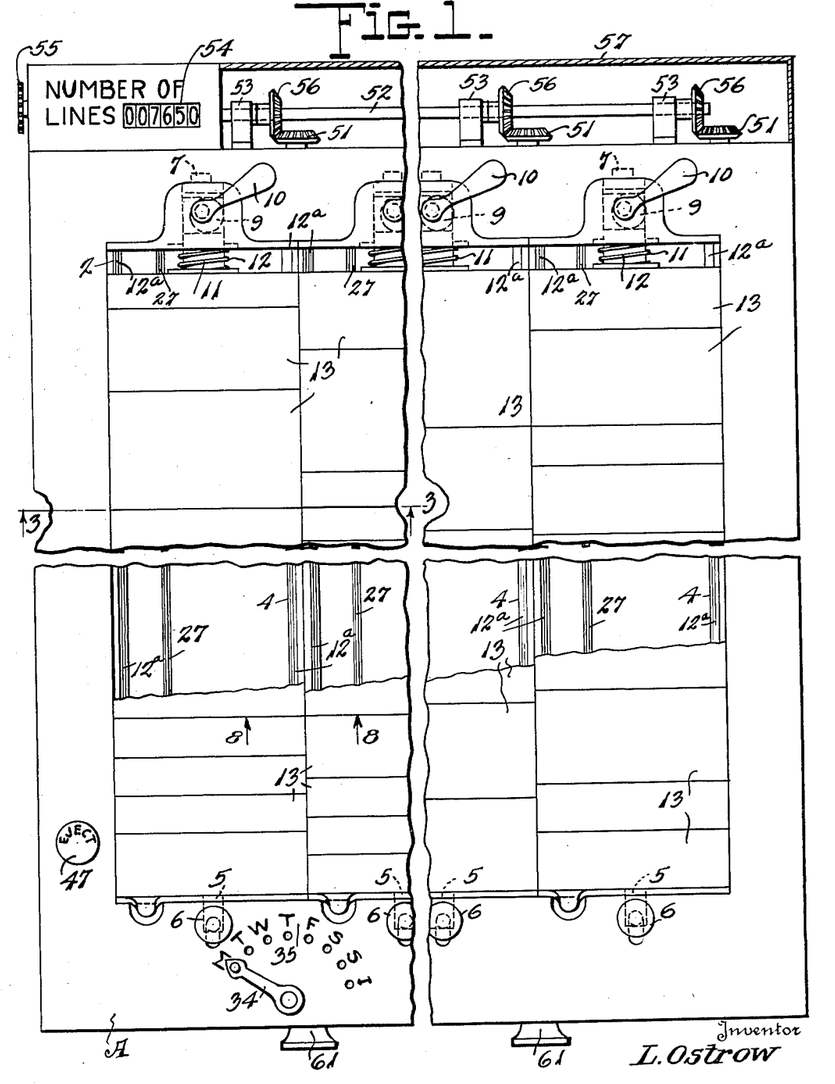
Fig. 1 is a plan view partly broken away and partly in section of an advertising layout apparatus or frame embodying my invention.
Figure 2:
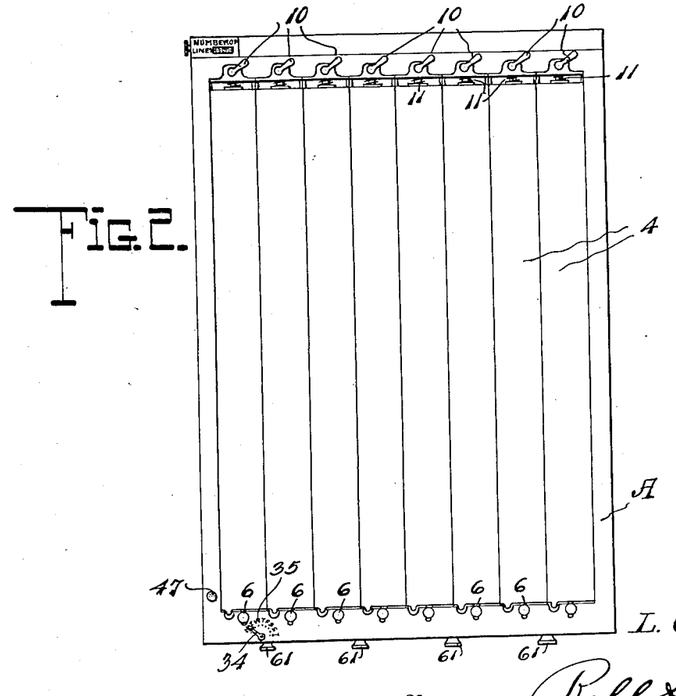
Fig. 2 is a view in smaller dimension of the device as shown in Fig. 1.

Recesses 62 (see Fig. 4) are formed in the end walls of the frame A to receive the transmission devices 59 when not in use and under these conditions, the knobs 61 will rest against the end of the frame A as shown in Figs. 1 and 4.

Each of the devices 59 comprises a frame composed of arms 64 in which are jornalled the vertical shafts 65. Each shaft 65 has fixed to the lower end thereof the pinion 66 meshing with the common pinion 67 rotatably carried on the frame 63. This pinion 67 has secured thereto a beveled gear 68 meshing with a bevel gear 69 rotatably carried on the frame 63. This pinion 67 has secured thereto a beveled gear 68 meshing with a bevel gear 69 rotatably carried by a third arm 70 on the member 59. The gear 69 is splined on the shaft 50 so as to be freely rotatable to effect rotation of the shaft. The shafts 65 have freely rotatable thereon the star wheels 71, these star wheels being adapted to engage the pins 24 on the blocks 13 as the device 59 is moved toward one end or the other of the frame and they will be rotated one increment of movement for each pin struck by the star wheels.

The lower faces of the star wheels have secured thereto the ratchet clutch members 72 cooperating with similar clutch collars 73 splined on the vertical shafts 65. A compression spring 74 is disposed between each clutch collar 73 and arm 59 to yieldably hold the clutch members in engagement with the ratchet members on the star wheels.

When it is desired to total the number of lines of advertising in the display frame, the operator will grasp the knob 61, pull it outwardly to draw the device 59 from its recess 62 in the frame A along the guides 3a to the bottom or near the end of the frame. As the points of the star wheels 71 strike pins 24, the wheels will be rotated. During the outward movement the ratchet clutch member 72 on the right hand side of the device 59 will override while on the inward or return movement of the device 59 the left-hand clutch member 72 will override while the right-hand clutch remains engaged to rotate the shaft 65 and through the gears 66, 67, 68, 69, cause the shaft 50 to be rotated, always in an anti-clockwise direction. Each device 59 will take care of two panels as hereinbefore premised and in a very short time just before the photo-engraving step the number of lines of advertising for the day's issue can be accurately counted. Obviously, the same principles may be extended to enable the counting of the ads rather than the lines of the ads, the necessary mechanism being arranged to cooperate with the line counting mechanism or substituted therefor.

A full stroke mechanism may be provided, if desired, compelling the operator to pull the rod 60 outwardly the full distance before it can be returned, and during the return movement it must be fully returned before it can again be pulled, in order to prevent improper manipulation of the knob 61 and rod 60 and a resulting inaccurate count of the number of lines in the form. Such mechanism is not herein described or claimed as it forms no part of this particular inventive combination.

Having now fully described this apparatus, a brief summary of the make-up routine in which it is used may be desired. When the advertising matter is received at the publication counter, it is immediately written out or typed upon what is known as a varityper machine. Such machine is known to the trade and is similar to a typewriter except for the fact that it is constructed to enable the imitation of any type used in newspaper printing. The typed slip of paper is now cut to proper size and applied in any manner to a base member or block 13, the ends being engaged under clip holders in the sides of the block or under a transparent clip 75 such as shown in Fig. 16 of the drawings, or pasted upon the block as may be desired. The base member is now set in one of the panels 4 under the proper heading. If the ad is larger than the general average ad base member an extension unit such as shown in Figs. 12 or 15 may be attached to the side of the base member. In lieu of the use of such extensions block members of different sizes according to the number of ad lines may be employed even to the complete size of the panel frame 4.

Obviously, with the make-up frame or chase before the publication counter, the clerks can always determine the amount of space available at any time during the day up to the closing of the form and so can the advertiser who is also able to see the position in the page at which his particular ad is disposed.

At the proper time when the chase or frame is completed, the blocks are locked in position as before described. The frame is now sent to the photo-engraving department and the usual plate for running off on the press is prepared. Thus a routine process of the present day requiring some eighteen to twenty different steps is reduced to only a few, with the consequent reduction in costs, errors, time and labor.

While the specific details of construction have been herein shown and described, the invention is not confined thereto as changes and alterations may be made without departing from the spirit thereof as defined by the appended claims.

Having thus described my invention what I claim as new and desire to secure by Letters Patent is:

1. In make-up and lay-out apparatus of the class described the combination of a main frame, a block holding panel frame corresponding to a page column removably mounted therein, latch means for holding said panel frame in the main frame, and block members shiftably mounted within said panel frame to occupy a desired position in the column in said panel frame.

2. In make-up and lay-out apparatus of the class described the combination of a main frame, a block holding panel frame corresponding to a page column removably mounted therein, latch means for holding said panel frame in the main frame, block members shiftably mounted in said panel frame to any desired position between the top and bottom thereof, and means releasably and slidably holding said block members at the predetermined position in said panel frame.

3. In make-up and lay-out apparatus of the class described the combination of a main frame, a panel frame removably mounted therein, the side members of said panel frame having latch engaging elements, and shiftable block members having at their ends latch members constructed to interlockingly engage the latch engaging elements aforesaid to permit shifting.

4. In make-up and lay-out apparatus of the class described the combination of a main frame, a panel frame removably mounted therein corresponding to a page column, the side members of said panel frame having latch engaging elements, shiftable block members having at their ends latch members constructed to interlockingly engage the latch engaging elements aforesaid to permit shifting to various columnar positions, and means for clamping said block members in adjusted position.

5. In make-up and lay-out apparatus of the class described the combination of a frame, base members removably mounted therein, and a single means arranged in cooperative relation to all said members for ejecting one or more said base members at one operation thereof.

6. In make-up and lay-out apparatus of the class described the combination of a frame, base members displaceably mounted therein in column formation, and a single means arranged in cooperative relation to all said members for ejecting any one or more of said base members at one operation thereof, including means carried by the base members with which said single means coacts for controlling their ejection.

7. In make-up and lay-out apparatus of the class described the combination of a frame, base members displaceably mounted therein in column formation, means for ejecting any one or more of said base members including an ejector bar common to all of said base members, and means on the base members for predetermining cooperation with said bar for ejection purposes.

8. In make-up and lay-out apparatus of the class described the combination of a frame, base members movably mounted therein, and means for ejecting any one or more of said base members including an ejecting member shiftable relative to each of said base members to cooperate therewith at different points.

9. In make-up and lay-out apparatus of the class described the combination of a frame, base members movably mounted therein, means for ejecting any one or more of said base members including an ejector member adapted to engage and displace any of said base members, and adjustable means on said base members shiftable into and out of position for coaction with said ejector member.

10. In make-up and lay-out apparatus of the class described the combination of a frame, base members removably mounted therein in column formation, means for ejecting said base members including an ejecting member shiftable laterally of the base members to different positions relative thereto, and means on said base members shiftable to different positions for cooperation with the ejecting member in any one of its said positions.

11. In make-up and lay-out apparatus of the class described the combination of a frame, base members removably mounted therein in column formation, means for ejecting said base members including an ejecting member shiftable laterally of the base members to different positions relative thereto, means on said base members shiftable to different positions for cooperation with the ejecting member in any one of its said positions, and means on the frame for adjusting said ejecting member.

12. In make-up and lay-out apparatus of the class described the combination of a frame, base members removably mounted therein in column formation, means for ejecting said base members including an ejecting member shiftable laterally of the base members to different positions relative thereto, means on said base members shiftable to different positions for cooperation with the ejecting member in any one of its said positions, means on the frame for adjusting said ejecting member, and separate manipulating means for actuating said ejecting member when it has been adjusted.

13. In make-up and lay-out apparatus of the class described the combination of a frame, base members removably mounted therein in column formation, means for ejecting said base members including an ejecting member shiftable laterally of the base members to different positions relative thereto, means on said base members shiftable to different positions for cooperating with the ejecting member in any one of its said positions, means on the frame for adjusting said ejecting member, and indicator means for said adjusting means for the ejector and for the shiftable means on the base members, whereby cooperation for ejecting purposes may be predetermined.

14. In make-up and lay-out apparatus of the class described a main frame, a panel frame removably mounted therein, base members displaceably mounted in said panel frame, an ejecting bar extending under the said base member, a clip member on each of said base members with which said ejecting bar cooperates for ejection of the base member, and an operating member on the main frame for actuating said bar into engagement with the clip member to eject the base member.

15. In make-up and lay-out apparatus of the class described a main frame, a panel frame removably mounted therein, base members displaceably mounted in said panel frame, an ejecting bar extending beneath said base member, a clip member on each of said base members with which said ejecting bar cooperates for ejection of the base member, an operating member on the main frame for actuating said bar into engagement with the clip member to eject the base member, and an adjusting member on said main frame for moving the bar relative to the base members to thereby establish and disestablish cooperative relation with said clip member.

16. In make-up and lay-out apparatus of the class described a main frame, a plurality of panel frames removably mounted therein in side by side relation, base members displaceably mounted in each of said panel frames and having locking means for shiftably holding the base members in said frame, a clip member adjustably mounted on said base members, indicator means associated with the clip member for determining the positions of the same, ejecting mechanism mounted in the main frame and including an ejector bar for each of said panel frames, adjusting means for adjusting the said ejector bars simultaneously, an indicator associated with said adjusting means, a depressible ejector member carried by the main frame, and means coacting with the ejector member and the ejector bars for shifting said bars into contact with the clip members when said ejector member is depressed.

17. A base member for advertisement make-up and lay-out apparatus comprising an ad holding block and a clip member shiftably mounted to different positions on the block.

18. A base member for advertisement make-up and lay-out apparatus including a clip member shiftably mounted on said base members, and an indicator associated with said clip member to determine positions of the latter.

19. In make-up and lay-out apparatus of the class described the combination of a frame, ad supporting base members mounted therein, a counting mechanism mounted on said frame, and means for actuating said counting mechanism for performing a counting action related to said base members.

20. In make-up and lay-out apparatus of the class described the combination of a frame, ad supporting base members mounted therein, a counting mechanism mounted on said frame, means on said base members for actuating said counting means, and manipulating means for establishing a coaction betwen' the actuating means and the counting mechanism to perform a counting action relating to said base members.

21. In make-up and lay-out apparatus of the class described the combination of a frame, ad supporting base members mounted therein, a counting mechanism mounted on said frame including a unit shiftably along the base members, means for moving said unit to and fro, and means on the base members for actuating the unit as it is moved relative to the base members whereby to perform a counting action related to said base members.

22. In a make-up and lay-out apparatus of the class described, the combination of a frame, a plurality of base members mounted therein and adapted to carry advertising lines, a counting mechanism mounted in said frame including a shiftable unit for traversing the base members, and means on said base members with which said traversing unit is adapted to cooperate to actuate the counting means, the means on the base members corresponding with the lines of advertising carried by said base members.

23. In a make-up and lay-out apparatus of the class described, the combination of a frame, a plurality of block members mounted in each of said panel frames and adapted to carry line advertisements, a counter device carried by said frame, a gear and clutch unit operatively connected to said counter device and disposed to traverse the block members in adjacent panel frames, and means on said block members for engagement by the gear and clutch unit during its traversing movement for actuating the counting device to determine the number of units of advertising carried by the blocks in said panel frames.

24. In a make-up and lay-out apparatus of the class described, the combination of a frame, a plurality of block members mounted in each of said panel frames and adapted to carry line advertisements, a counter device carried by said frame, a gear and clutch unit operatively connected to said counter device and disposed to traverse the block members in adjacent panel frames, means on said block members for engagement by the gear and clutch unit during its traversing movement for actuating the counting device to determine the number of units of advertising carried by the blocks in said panel frames, and means for shifting the clutch and gear unit whereby upon movement in one direction the counting mechanism is actuated from the blocks in one panel frame and upon a reverse movement to actuate the counting mechanism from the blocks in an associated panel frame.

LOUIS OSTROW.